United States Patent [19]

Seito et al.

[11] Patent Number: 4,733,098

[45] Date of Patent: Mar. 22, 1988

[54] IMAGE READING APPARATUS COMPRISING FIRST AND SECOND SUBSTRATES SEPARATED AT A FIXED DISTANCE

[75] Inventors: Shinichi Seito, Atsugi; Makoto Ogura; Tatsundo Kawai, both of Hiratsuka; Hirofumi Iwamoto, Machida, all of Japan

[73] Assignee: Canon Kabushiki Kaisha, Tokyo, Japan

[21] Appl. No.: 6,676

[22] Filed: Jan. 27, 1987

Related U.S. Application Data

[63] Continuation of Ser. No. 756,723, Jul. 19, 1985, abandoned.

[30] Foreign Application Priority Data

Aug. 30, 1984 [JP] Japan ............................ 59-130602[U]

[51] Int. Cl.$^4$ ...................... H01J 40/14; H01L 27/14; H01L 31/00
[52] U.S. Cl. ........................................ 250/578; 357/30
[58] Field of Search ................ 250/578, 211 J, 211 R; 358/293, 213.11; 357/30 H, 30 D

[56] References Cited

U.S. PATENT DOCUMENTS

| | | | |
|---|---|---|---|
| 4,190,775 | 2/1980 | Sakurai et al. | 250/211 J |
| 4,271,435 | 6/1981 | Takenouchi et al. | 250/211 J |
| 4,317,137 | 2/1982 | Tompkins | 358/293 |
| 4,350,886 | 9/1982 | Pommerrenig | 250/578 |

FOREIGN PATENT DOCUMENTS

0211869 12/1982 Japan .................................. 358/293

Primary Examiner—David C. Nelms
Assistant Examiner—William L. Oen
Attorney, Agent, or Firm—Fitzpatrick, Cella, Harper & Scinto

[57] ABSTRACT

An image reading apparatus comprising a photosensor for receiving light from a light source through an original document, a wiring section for driving the photosensor, a circuit for driving the photosensor and for processing an output signal from the photosensor. The apparatus includes a first substrate having the photosensor and the wiring section thereon, and a second substrate having the circuit thereon and being separated from the first substrate. The second substrate is fixed above the first substrate.

11 Claims, 5 Drawing Figures

IMAGE READING APPARATUS COMPRISING FIRST AND SECOND SUBSTRATES SEPARATED AT A FIXED DISTANCE

This application is a continuation of application Ser. No. 756,723 filed July 19, 1985, now abandoned.

BACKGROUND OF THE INVENTION

1. Field of the Invention

The present relates to image reading apparatus which read optical image data and output them as an electrical signal, and more particularly to image reading apparatus which are intended to have a simplified and miniaturized structure.

The image reading apparatus according to the present invention is applied to input units of facsimiles or reproduction apparatus, for example.

2. Description of the Prior Art

Generally, an image reading apparatus includes a plurality of photosensors arranged in an array and receiving reflected light and/or transmitted light from an original document. The photosensors are scanned to read data of an image in the document as an electrical signal.

As typical photosensor drive systems, there are a matrix drive system and a direct drive system.

FIG. 1 is a perspective view of a sensor substrate of a conventional image reading apparatus employing a matrix drive system.

In FIG. 1, photosensor array 2 which includes a plurality of photosensors disposed on a substrate 1. Array 2 is divided into a plurality of blocks each including a fixed number of photosensors. One-sided terminals of photosensors for each block are connected to a matrix wiring section 3 and the other-sided terminals are connected together to a drive circuit chip 4. Matrix wiring section 3 is connected via a drive circuit chip 5 to a signal processor chip 6.

FIG. 2 is a cross-sectional view of a conventional image reading apparatus using the sensor substrate of FIG. 1.

In FIG. 2, the sensor substrate is fixed to a base 7 and protected by an upper cap 8 covering base 7. Provided on base 7 is a light source 9, the light from which is reflected by an original document 10. The reflected light is focused by a focusing rod lens array 11 onto photosensor array 2.

Drive circuit chip 4 applies a drive voltage sequentially to the respective photosensor blocks of photosensor array 2 to activate the photosensors. Optical data from the activated photosensors are sequentially read as a serial signal by the operation of matrix wiring section 3 and drive circuit chip 5. Such matrix driving causes all the data of photosensor array 2 and hence image data of document 10 included in a scanned line to be read. Thus the whole image in document 10 is read as an electrical signal as document 10 is moved in the direction of arrow A.

As described above, in the matrix drive system, the construction of the drive circuit and signal processor is simplified, so that the number of circuit chips is reduced although many photosensors are disposed.

As shown in FIG. 1, however, when array 2, matrix wiring section 3, drive circuit and signal processor chips 4 to 6, etc., are constructed integrally on substrate 1, matrix wiring section 3 and other wiring sections occupy a relatively large area, which is an obstacle to miniaturization of the whole apparatus.

On the other hand, the direct photosensor drive system includes drive circuit chips corresponding to the photosensors to read optical data as a serial signal, so that the wiring sections do not occupy a large area as is the case with the matrix drive system. Since, however, the direct photosensor drive system mounts many circuit chips, it occupies a large mounting area, thereby rendering it difficult to attain miniaturization. In addition, since the apparatus includes the same number of circuit chips as of photosensors, an increase in cost cannot be avoided. More particularly, in a high-accuracy reader with many photosensors, such a drawback is obvious.

As described above, it is difficult to miniaturize the conventional image reading apparatus.

SUMMARY OF THE INVENTION

It is an object of the present invention to provide an improved image reading apparatus which solves the above problems.

Another object of the present invention is to provide an image reading apparatus which has a simple miniaturized construction and is capable of performing a high-accuracy reading operation.

According to the present invention, there is provided an image reading apparatus which includes a two-stage construction which comprises a first substrate on which a photosensor section or array and a wiring section (for example, a matrix wiring section) therefor are formed, and a second substrate, separated from the first substrate, on which a drive circuit and a signal processor for driving the photosensors and reading the optical data, respectively.

DETAILED DESCRIPTION OF THE PREFERRED EMBODIMENT

Now the preferred embodiment of the present invention will be described with respect to the drawings.

Figure 2:
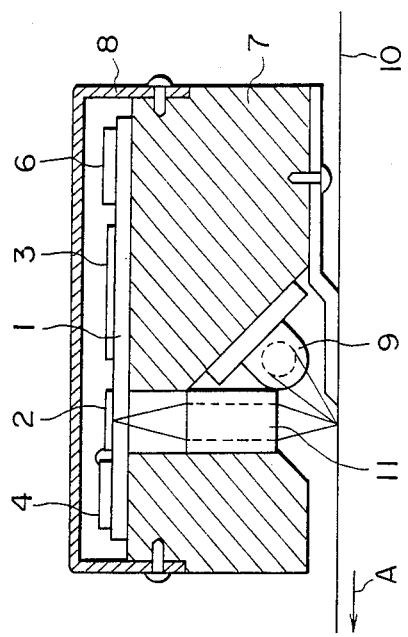
FIG. 2 is a cross-sectional view of the conventional image reading apparatus using the sensor substrate in FIG. 1.
Figure 1:
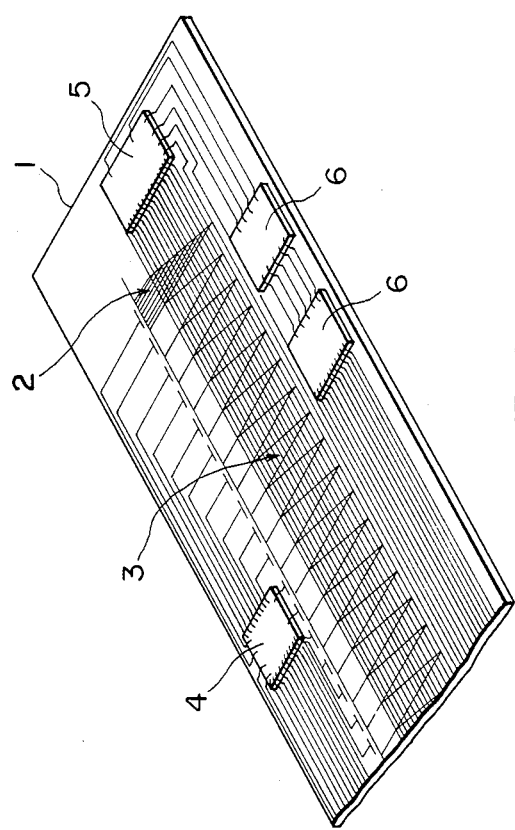
FIG. 1 is a perspective view of a sensor substrate of a conventional image reading apparatus employing a matrix drive system.
Figure 3:
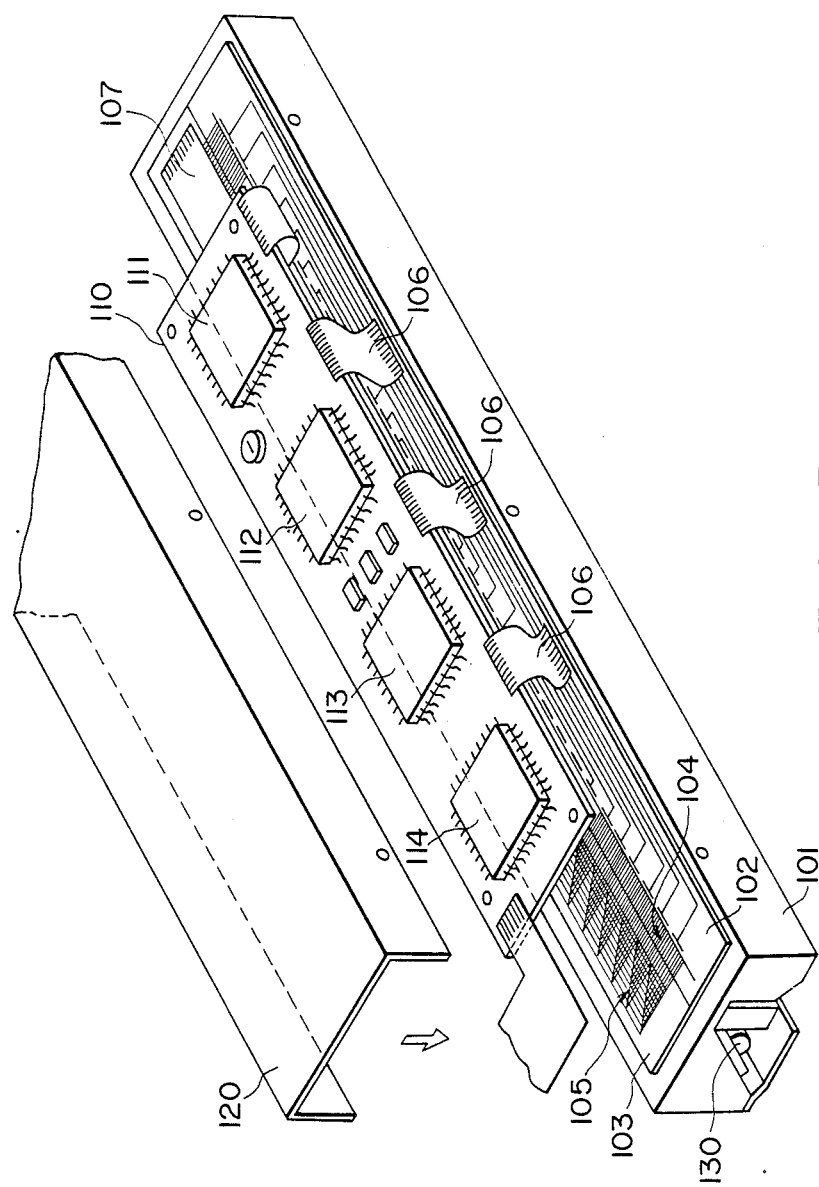
FIG. 3 is an exploded perspective view of the preferred embodiment of an image reading apparatus according to the present invention.
Figure 4:
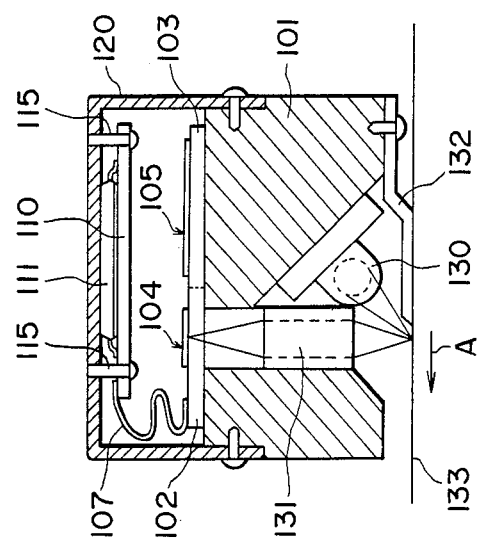
FIG. 4 is a cross-sectional view of the embodiment of FIG. 3.

FIG. 3 is an exploded perspective view of the preferred embodiment of an image reading apparatus according to the present invention, and FIG. 4 is a cross-sectional view of a embodiment.

In FIG. 3, a base 101 has a sensor substrate 102 and a matrix wiring substrate 103 fixed thereon. A photosensor array 104 and common wiring therefor are formed on sensor substrate 102. A matrix wiring section 105 is formed on matrix substrate 103. The respective photosensors of array 104 are connected to matrix wiring section 105.

There is, however, no need for sensor substrate 102 and matrix wiring substrate 103 to be separated from each other. If photosensor array 104 and matrix wiring section 105 are formed on a single substrate, the whole mounting process will be simplified and construction will be rendered compact. However, on the other hand, heat, light, and contamination produced in formation of matrix wiring section 105 may be a restriction on the formation of the photosensors.

On the contrary, formation of photosensor array 104 and matrix wiring section 105 on separate substrates as in the particular embodiment requires a minute step of connecting the wiring of the two substrates, thereby increasing the number of process steps. There is, however, an advantage that carefully examined articles whose quality is certain can be used as substrates and there are fewer restrictions to formation of photosensor array 104, thereby increasing the reliability and yield of the product.

Common connections, each including the common junction for each block of one-sided terminals of photosensor array 104 on sensor substrate 102, and output terminals of matrix wiring section 105 on matrix wiring substrate 103 are connected via flexible wiring plates 106 and 107, respectively, corresponding to circuit chips of a circuit substrate 110. That is, the common connections are connected to a drive circuit chip 111 to apply a voltage to the respective photosensor blocks 104 while the output terminals of matrix wiring section 105 are connected to a drive circuit chip 112 so that optical data of the photosensors in a block to which a voltage is applied are output in parallel to the drive circuit chip 112.

Drive circuit chip 112 converts input parallel optical data to serial data which are then amplified and adjusted by signal processing circuits 113 and 114, respectively.

Circuit substrate 110 having such circuit chips 111 to 114 is fixed inside an upper cap 120. More particularly, in FIG. 4, circuit substrate 110 is fixed by fastening screws 115 inside upper cap 120 which is in turn fixed to base 101, covering sensor substrate 102 and matrix wiring substrate 103.

Thus, as shown in FIG. 4, the apparatus includes a two-staged construction which comprises sensor substrate 102, matrix wiring substrate 103 and circuit substrate 110 fixed thereabove, with upper surfaces of circuit chips 111 to 114 contacting the inside surface of upper cap 120. Upper cap 120 is made of metal or an electrically and thermally conductive plastic material or the like so that it functions to protect the photosensors, the wiring and the circuit chips mechanically. It also has the functions of an electromagnetic shield to eliminate noise, and of a heat radiating fin to radiate heat produced by the circuit chips and the like.

Circuit substrate 110 may include a hard substrate of a glass epoxy material, a glass polyimide material, or a phenolic material, or a flexible substrate made of a polyimide material or a polyester material.

The hard substrate has a relatively large degree of freedom to mount parts thereon and is easy to design and handle. The number of connections between the substrates increases, however, so that an additional space for wiring is required, thereby increasing the size of the substrate to some extent.

In contrast, the flexible substrate may be formed integrally with flexible wiring plates 106 and 107, thereby resulting in a compact construction. The flexible substrate is, however, more expensive than the hard substrate.

Thus, selection between the hard and flexible substrates for circuit substrate 110 depends on whether compactness or inexpensiveness is regarded as more important.

Fixed under substrate 101 are an LED array 103, a focusing rod lens array 131 and a sheet holder 132. Light from LED array 130 is reflected by an original document 133 held by sheet holder 132 and the reflected light is then focused by rod lens array 131 as a scanning line onto photosensor array 104.

Figure 5:
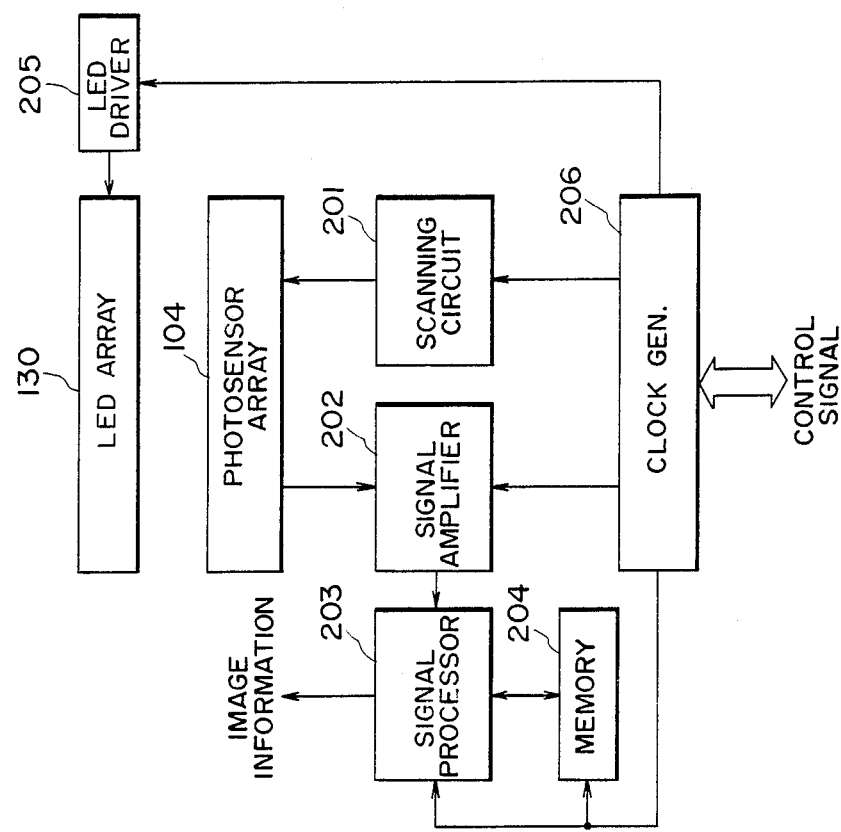
FIG. 5 is a block diagram of the embodiment of FIG. 3.

The operation of the present embodiment having such construction will be described with respect to FIG. 5, which is a block diagram of the embodiment.

As described above, light striking a scanning line on document 133 is reflected by the document and enters photosensor array 104 formed on substrate 102. Photosensor array 104 is matrix driven by a scanning circuit 201 (drive circuit chips 111 and 112) and serial optical data obtained by the matrix driving are input via a signal amplifier 202 to a signal processor 203. Processor 203 reads correction values or the like stored in advance in a memory 204, performs correction, etc., to the input optical data, and outputs the results as image data.

LED array 130 is driven by an LED driver 205. The operation of the whole apparatus is timing-controlled by clock pulses which are generated by a clock generator 206 in accordance with a control signal from a control unit (not shown).

While, in the particular embodiment, a matrix drive system has been described, the present invention is not limited to this, but applicable to a direct drive system as well.

As described above, an image reading apparatus according to the present invention includes a substrate on which photosensors and another wiring section therefor are formed, and, separate from that substrate, a second substrate, on which a drive circuit for the photosensors and a signal processor, etc., are formed. Therefore, the apparatus has an increased degree of freedom to mount parts on the substrates and is easy to design and handle.

In addition, the apparatus includes a two-staged (upper and lower) construction of substrates which serves to render the whole apparatus compact.

Furthermore, an arrangement in which the substrate having photosensors thereon is fixed to a base and the substrate having a drive circuit, etc., is fixed inside a cap covering the base, with the latter substrate contacting the cap, serves to efficiently radiate heat generated by the circuits, thereby improving the stability and reliability of the reading operation. In addition, use of an upper cap serves to eliminate the need to provide a special substrate support, thereby simplifying the structure.

What is claimed is:

1. An image reading apparatus, comprising a photosensor for receiving light from an original document at a predetermined position relative to said photosensor, a wiring section for use in driving said photosensor, a circuit for driving said photosensor and for processing an output signal from said photosensor, a first substrate supporting said circuit, substrate means supporting said photosensor and said wiring section a base fixedly supporting said substrate means, a cap supporting said substrate at a position such that said substrate means is between said substrate and the predetermined position, and a flexible electrical connector electrically connecting said photosensor with said circuit; said cap, said base and said connector being so structured and arranged as to permit assembly of said apparatus by fixing said substrate to said cap, said substrate means and said connector to said photosensor and said circuit and thereafter putting said cap in place in contact with said base and fixing said cap and said base relative to each other.

2. An apparatus according to claim 1, wherein said first substrate is a hard substrate.

3. An apparatus according to claim 1, wherein said cap has electrical thermal conductivity.

4. An apparatus according to claim 1, further comprising a light source for illuminating the original document at said predetermined position, wherein said light source includes an LED array.

5. An apparatus according to claim 1, further comprising an optical focusing system provided in an optical path between said predetermined position and said photosensor.

6. An apparatus according to claim 5, wherein said focusing system includes a focusing rod lens array.

7. An apparatus according to claim 1, wherein said wiring section includes a matrix wiring section.

8. An apparatus according to claim 1, wherein said photosensor includes a plurality of unit photoreceptor faces arranged in an array.

9. An apparatus according to claim 1, wherein said first substrate is a flexible substrate.

10. An apparatus according to claim 1, wherein said substrate means is of one-piece construction.

11. An apparatus according to claim 1, wherein said substrate means comprises a second substrate, supporting said photosensor, and a third substrate, supporting said wiring section.

* * * * *